US008856295B2

(12) United States Patent
Aliminati (10) Patent No.: US 8,856,295 B2
(45) Date of Patent: Oct. 7, 2014

(54) SYSTEM AND METHOD FOR PROVIDING AN ENTERPRISE DEPLOYMENT TOPOLOGY WITH THICK CLIENT FUNCTIONALITY (75) Inventor: Janga Aliminati, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 113 days.

(21) Appl. No.: 13/468,792

(22) Filed: May 10, 2012

(65) Prior Publication Data
US 2013/0179874 A1 Jul. 11, 2013

Related U.S. Application Data (60) Provisional application No. 61/585,188, filed on Jan. 10, 2012, provisional application No. 61/620,881, filed on Apr. 5, 2012.

(51) Int. Cl.
G06F 15/177 (2006.01)
(52) U.S. Cl.
USPC ............................. 709/222; 717/176; 726/26
(58) Field of Classification Search
USPC ............................. 709/222; 717/176; 726/26
See application file for complete search history.

(56) References Cited

U.S. PATENT DOCUMENTS

| 7,210,143 B2 | 4/2007 | Or et al. |
| 7,240,325 B2 | 7/2007 | Keller |
| 7,926,051 B2 | 4/2011 | Barta et al. |
| 8,290,627 B2 | 10/2012 | Richards et al. |
| 8,312,127 B2 | 11/2012 | Nedelcu et al. |
| 2002/0157020 A1* | 10/2002 | Royer .......................... 713/201 |
| 2004/0122942 A1* | 6/2004 | Green et al. .................. 709/224 |
| 2005/0080801 A1 | 4/2005 | Kothandaraman et al. |
| 2005/0273849 A1* | 12/2005 | Araujo et al. ................... 726/12 |
| 2006/0080413 A1 | 4/2006 | Oprea et al. |
| 2007/0136788 A1* | 6/2007 | Monahan et al. ................ 726/3 |
| 2007/0260702 A1 | 11/2007 | Richardson et al. |

(Continued)

FOREIGN PATENT DOCUMENTS

| EP | 1577765 | 9/2005 |
| EP | 1565814 | 11/2007 |
| EP | 1974263 | 10/2008 |

OTHER PUBLICATIONS

SAS(R) 9.2 Intelligence Platform: Installation and Configuration Guide, http://support.sas.com/documentation/cdl/en/biig/60946/HTML/default/viewer.htm#befdep.htm, retrieved Dec. 26, 2012, 4 pages.

(Continued)

Primary Examiner — Li B Zhen
Assistant Examiner — Viva Miller
(74) Attorney, Agent, or Firm — Meyer IP Law Group (57) ABSTRACT In accordance with an embodiment, one or more software application products, such as Oracle Fusion Applications, can be installed and/or configured according to an integration and deployment design/blueprint that is built or optimized for use within a multi-tiered deployment topology at an organization's (i.e., customer's) data center. Based on the customer site topology, provisioning of the software applications can be optimized; and application life cycle operations performed. This enables each product to be aware of the topology, which in turn provides customers with an "out-of-the-box" solution. The topology can also be optimized for security, performance and simplicity. In accordance with an embodiment, the deployment topology can include thick client functionality.

20 Claims, 6 Drawing Sheets

(56) References Cited

U.S. PATENT DOCUMENTS

| | | | |
|---|---|---|---|
| 2008/0098099 | A1 | 4/2008 | Khasnis et al. |
| 2008/0256531 | A1 | 10/2008 | Gao et al. |
| 2010/0058331 | A1 | 3/2010 | Berg et al. |
| 2011/0289134 | A1* | 11/2011 | de Los Reyes et al. ....... 709/203 |
| 2012/0005646 | A1 | 1/2012 | Manglik et al. |

OTHER PUBLICATIONS

Deployment Plan, http://msdn.microsoft.com/en-us/library/ff649036.aspx, retrieved Dec. 26, 2012, 6 pages.

Coupaye, T. et al., Foundations of Enterprise Software Deployment, http://equipes-lig.imag.fr/adele/Les.Publications/intConferences/CSMR2000Est.pdf, Oct. 1999, 9 pages.

Automated Provisioning for Applications in the Cloud, VMware vFabric Application Director: Provisioning & Management, http://www.vmware.com/products/application-platform/vfabric-application-director/overview.html, retrieved Dec. 26, 2012, 2 pages.

VMware vFabric Application Director, Provision and Scale High-Performing Applications Faster in the Cloud, A Riverbed and VMware Joint Partner Brief, Aug. 21, 2012, http://www.riverbed.com/vmware/assets/PartnerSolutionBrief-Riverbed_Stingray_vFabric_App_Dir.pdf, 4 pages.

Amazon Virtual Private Cloud FAQs, Amazon Web Services, http://aws.amazon.com/vpc/faqs/, retrieved Dec. 26, 2012, 13 pages.

Securing the Microsoft Platform on Amazon Web Services, Amazon Web Services, Aug. 2012, http://d36cz9buwru1tt.cloudfront.net/AWS_Microsoft_Platform_Security.pdf, 22 pages.

Dell Kace—Software Deployment Tools and Automated Solutions, Enterprise Software Deployment Appliances and Tools—Dell KACE™, http://www.kace.com/solutions/business-needs/systems-deployment, retrieved Dec. 24, 2012, 3 pages.

Pistoia, M. et al., Enterprise Java Security, Building Secure J2EE Applications, 2004, http://flylib.com/books/en/4.289.1.56/1/, retrieved Dec. 26, 2012, 4 pages.

European Patent Office, International Searching Authority, International Search Report and Written Opinion dated Apr. 8, 2013 for International Application No. PCT/US2013/021048, 8 pages.

* cited by examiner

SYSTEM AND METHOD FOR PROVIDING AN ENTERPRISE DEPLOYMENT TOPOLOGY WITH THICK CLIENT FUNCTIONALITY

CLAIM OF PRIORITY

This application claims the benefit of priority to U.S. Provisional Patent Application titled "SYSTEM AND METHOD FOR PROVIDING AN ENTERPRISE DEPLOYMENT TOPOLOGY", application Ser. No. 61/585,188, filed Jan. 10, 2012; and U.S. Provisional Patent Application titled "SYSTEM AND METHOD FOR PROVIDING AN ENTERPRISE DEPLOYMENT TOPOLOGY", application Ser. No. 61/620,881, filed Apr. 5, 2012; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to application servers, and enterprise software deployment, and is particularly related to systems and methods for providing an enterprise deployment topology with thick client functionality.

BACKGROUND

Within the context of enterprise software application deployment, traditional methods of deployment often require organizations/customers to install software application products within a single node at a data center, or to customize the installation to best suit the particular requirements of the customer site. There is generally no predefined blueprint regarding the deployment of such products. Furthermore, in the context of software application products that are suitable for use over multiple geographic locations, such as Oracle Fusion Applications, a customer may wish to utilize a thick client which is, e.g., installed at a customer site but which is otherwise wired with servers at a remote hosting location, such as at an Oracle Data Center. However, such configurations can present security risks due to firewalls at the customer's network and at the data center network needing to be opened, and other performance implications. These are the general areas that embodiments of the invention are intended to address.

SUMMARY

In accordance with an embodiment, one or more software application products, such as Fusion Applications, can be installed and/or configured according to an integration and deployment design/blueprint that is built or optimized for use within a multi-tiered deployment topology at an organization's (i.e., customer's) data center. Based on the customer site topology, provisioning of the software applications can be optimized, and application life cycle operations performed. This enables each product to be aware of the topology, which in turn provides customers with an "out-of-the-box" solution. The deployment topology can also be optimized for security, performance and simplicity. In accordance with an embodiment, the deployment topology can include thick client functionality.

DETAILED DESCRIPTION

As described above, within the context of enterprise software application deployment, traditional methods of deployment can present security risks due to, e.g., firewalls at the customer's network and at the data center network needing to be opened. To address this, in accordance with an embodiment, one or more software application products, such as Fusion Applications, can be installed and/or configured according to an integration and deployment design/blueprint that is built or optimized for use within a multi-tiered deployment topology at an organization's (i.e., customer's) data center. The deployment topology can be optimized for security, performance and simplicity; and can also support the use of thick clients, or thick client functionality, where appropriate.

In accordance with an embodiment, an enterprise deployment topology is based on proven technologies and recommendations, and spans several products across a technology stack, e.g., Oracle Database, Fusion Middleware, Fusion Applications, and Fusion Middleware Control. In the context of Fusion Applications, enterprise deployment may also consider business service level agreements to make high-availability guidelines as widely applicable as possible; leverage database grid servers and storage grid with low-cost storage to provide highly resilient, lower cost infrastructure; use results from performance impact studies for different configurations to ensure that the high-availability architecture is optimally configured to perform and scale to business needs; enable control over the length of time to recover from an outage and the amount of acceptable data loss from a natural disaster; and/or follow recommended guidelines and architectures which are independent of hardware and operating systems. Examples of currently available Fusion Applications products include Oracle WebCenter; Oracle Business Intelligence; Hyperion; Oracle Universal Content Management; Oracle SOA Suite; Oracle WebLogic Server; Oracle JDeveloper; Oracle Enterprise Manager; Fusion Middleware Control; and Oracle Identity Management. Together, these products act as a suite of business applications that unify personal and enterprise processes, such as transactional business processes, business intelligence, and collaborative technologies.

GLOSSARY

In accordance with an embodiment, as referred to herein, the following terms are used. It will be evident that, in accordance with other embodiments, other features may be provided, and that the invention is not limited to the particular terminology and features described hereunder:

Oracle home: An Oracle home contains installed files necessary to host a specific product. For example, the SOA Oracle home contains a directory that contains binary and library files for Oracle SOA Suite. An Oracle home resides within the directory structure of the Middleware home.

WebLogic Server home: A WebLogic Server home contains installed files necessary to host a WebLogic Server. The WebLogic Server home directory is a peer of Oracle home directories and resides within the directory structure of the Middleware home.

Middleware home: A Middleware home consists of the Oracle WebLogic Server home, and, optionally, one or more Oracle homes. A Middleware home can reside on a local file system or on a remote shared disk that is accessible through NFS.

Oracle instance: An Oracle instance contains one or more active middleware system components, e.g., Oracle Web Cache, Oracle HTTP Server, or Oracle Internet Directory. An administrator can determine which components are part of an instance, either at install time or by creating and configuring an instance at a later time.

Domain: The basic administrative unit of Oracle WebLogic Server.

Managed Server: Hosts business applications, application components, Web services, and their associated resources.

Failover: When a member of a high availability system fails unexpectedly (unplanned downtime), in order to continue offering services to its consumers, the system undergoes a failover operation. If the system is an active-passive system, the passive member is activated during the failover operation and consumers are directed to it instead of the failed member. The failover process can be performed manually, or it can be automated by setting up hardware cluster services to detect failures and move cluster resources from the failed node to the standby node. If the system is an active-active system, the failover is performed by the load balancer entity serving requests to the active members. If an active member fails, the load balancer detects the failure and automatically redirects requests for the failed member to the surviving active members.

Failback: After a system undergoes a successful failover operation, the original failed member can be repaired over time and be re-introduced into the system as a standby member. If desired, a failback process can be initiated to activate this member and deactivate the other. This process reverts the system back to its pre-failure configuration.

Hardware cluster: A hardware cluster is a collection of computers that provides a single view of network services (e.g., an IP address) or application services (e.g., databases, Web servers) to clients of these services. Each node in a hardware cluster is a standalone server that runs its own processes. These processes can communicate with one another to form what looks like a single system that cooperatively provides applications, system resources, and data to users.

Cluster agent: The software that runs on a node member of a hardware cluster that coordinates availability and performance operations with other nodes.

Clusterware: Software that manages the operations of the members of a cluster as a system. It allows one to define a set of resources and services to monitor via a heartbeat mechanism between cluster members and to move these resources and services to a different member in the cluster as efficiently and transparently as possible.

Shared storage: Shared storage is the storage subsystem that is accessible by all the computers in the enterprise deployment domain.

Primary node: The node that is actively running a Fusion Applications instance at any given time and has been configured to have a backup/secondary node. If the primary node fails, a Fusion Applications instance is failed over to the secondary node.

Secondary node: The node that is the backup node for a Fusion Applications instance. This is where the active instance fails over when the primary node is no longer available.

Network host name: Network host name is a name assigned to an IP address either through the/etc/hosts file or through DNS resolution.

Physical host name: This guide differentiates between the terms physical host name and network host name. This guide uses physical host name to refer to the "internal name" of the current computer.

Physical IP: Physical IP refers to the IP address of a computer on the network. In most cases, it is normally associated with the physical host name of the computer.

Switchover: During normal operation, active members of a system may require maintenance or upgrading. A switchover process can be initiated to allow a substitute member to take over the workload performed by the member that requires maintenance or upgrading, which undergoes planned downtime.

Switchback: When a switchover operation is performed, a member of the system is deactivated for maintenance or upgrading. When the maintenance or upgrading is completed, the system can undergo a switchback operation to activate the upgraded member and bring the system back to the pre-switchover configuration.

Virtual host name: A virtual host name is a network addressable host name that maps to one or more physical computers via a load balancer or a hardware cluster. For load balancers, the name "virtual server name" is used herein interchangeably with virtual host name. A load balancer can hold a virtual host name on behalf of a set of servers, and clients communicate indirectly with the computers using the virtual host name. A virtual host name in a hardware cluster is a network host name assigned to a cluster virtual IP. Because the cluster virtual IP is not permanently attached to any particular node of a cluster, the virtual host name is not permanently attached to any particular node either.

Virtual IP: (Cluster virtual IP, load balancer virtual IP.) Generally, a virtual IP can be assigned to a hardware cluster or load balancer. To present a single system view of a cluster to network clients, a virtual IP serves as an entry point IP address to the group of servers which are members of the cluster. A virtual IP can be assigned to a server load balancer or a hardware cluster. A hardware cluster uses a cluster virtual IP to present to the outside world the entry point into the cluster (it can also be set up on a standalone computer). The hardware cluster's software manages the movement of this IP address between the two physical nodes of the cluster while clients connect to this IP address without the need to know which physical node this IP address is currently active on. In a typical two-node hardware cluster configuration, each computer has its own physical IP address and physical host name, while there could be several cluster IP addresses. These cluster IP addresses float or migrate between the two nodes. The node with current ownership of a cluster IP address is active for that address. A load balancer also uses a virtual IP as the entry point to a set of servers. These servers tend to be active at the same time. This virtual IP address is not assigned to any individual server but to the load balancer which acts as a proxy between servers and their clients.

Enterprise Deployment Topology

As described above, in accordance with an embodiment, an enterprise deployment topology is a design/blueprint or set of guidelines for use in configuring a system, which are based on proven technologies and recommendations, and which span several products across a technology stack. Each deployment topology provides specific application deployment characteristics within an enterprise environment, such as availability, scalability and security. Users at workstations can access, via a load balancer and firewall, a data center, such as an Oracle Data Center (ODC), which includes applications, such as Fusion Applications and other applications, that are provided according to a selected deployment topology.

Depending on the particular needs/requirements of the customer and/or the application itself, some applications may need to be exposed to the Internet, while others may need to be exposed only within the Intranet, and the selected deployment topology should take this into account. This allows particular applications to be deployed into an environment that use an Intranet internally for enterprise use, and also allows external users to access other applications using the Internet, all while maintaining security between the different applications.

In accordance with an embodiment, the applications at a data center can communicate with one another within the data center, using the hypertext transfer protocol (HTTP) and internal uniform resource locators (URLs), to process requests from the users. Since the internal URLs and their communications are provided within a demilitarized/secure zone (DMZ) of the data center, they can be secured without a need for, e.g., secure socket layer (SSL), which in turn provides performance benefits. The applications can also be accessed by users via virtual hosts and external URLs, which can utilize SSL. Depending on the particular needs/requirements of the customer and/or the application itself, different portions or aspects of the functionality can be made available to Intranet-based users, and/or to Internet-based users. Those URLs that are used only within the data center need not be exposed or accessible outside of the data center to those Intranet or Internet-based customers. During provisioning, if a particular application must have an externally-accessible address, then, in addition to its internal address/URL, an administrator can be prompted to provide a URL for the external address.

Figure 1:
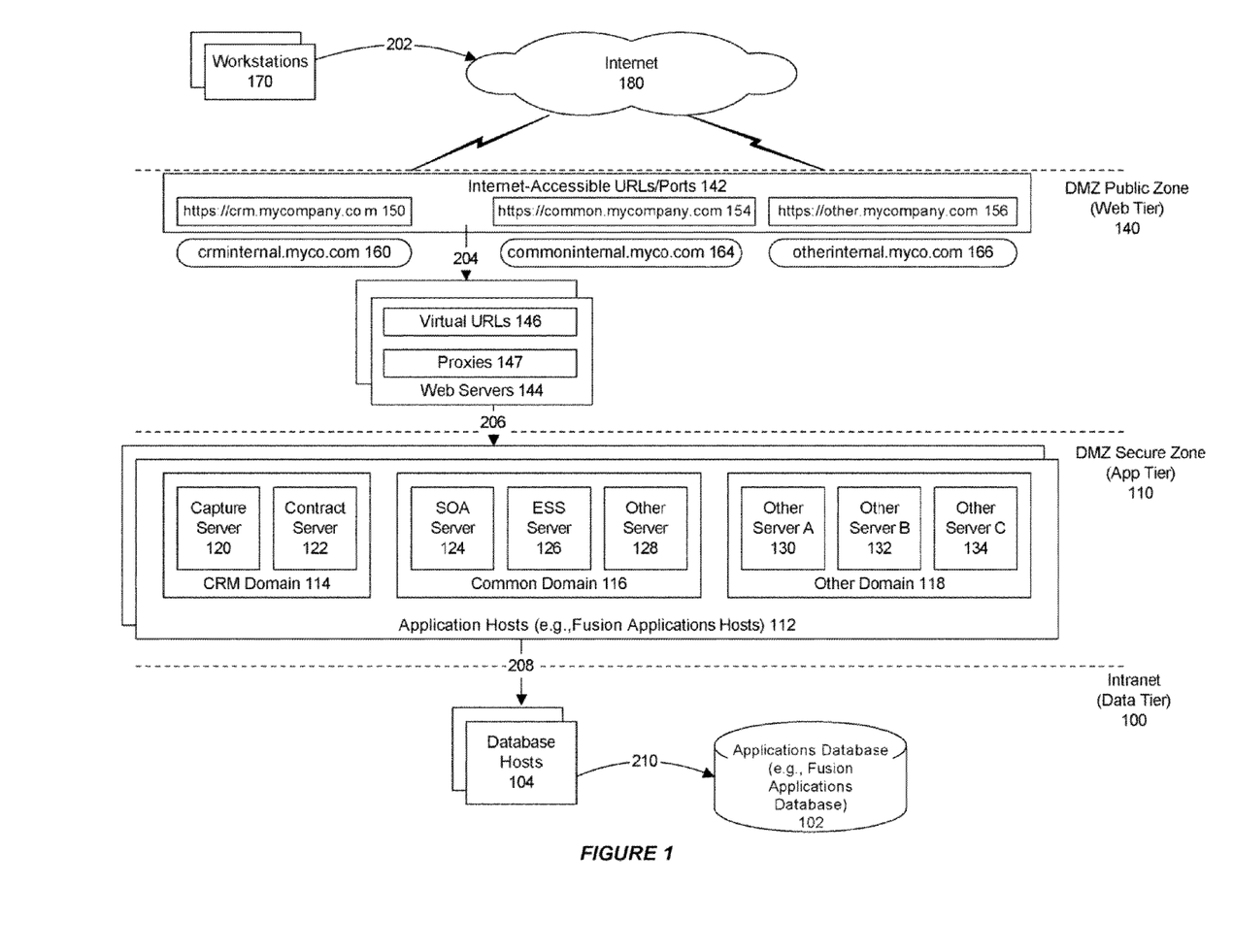
FIG. 1 illustrates a system which includes a multi-tiered enterprise deployment topology, in accordance with an embodiment.

FIG. 1 illustrates a system which includes a multi-tiered enterprise deployment topology, in accordance with an embodiment. As shown in FIG. 1, a data center (e.g., an ODC data center) can logically include a plurality of tiers, including an Intranet-accessible data tier 100, a DMZ-secured application (app) tier 110, and a DMZ-secured public zone or web tier 140.

In accordance with an embodiment, the data tier can include one or more application databases (e.g., a Fusion Applications database) 102, which are accessible via one or more database hosts 104.

The application tier can include one or more application hosts or nodes (e.g., Fusion Applications hosts) 112, each of which in turn include one or more domains and servers. For example, as shown in FIG. 1, an application host may include a customer relationship management (CRM) domain 114, a common domain 116, and various other domains 118; each of which respectively may include a capture server 120, contract server 122, SOA server 124, ESS server 126, or other servers 128, 130, 132, 134.

The DMZ-secured public zone or web tier can include one or more web servers 144, configured with virtual URL's 146 and proxies 147. In accordance with an embodiment, the web tier is selectively accessible to Internet-based workstations 170, via the Internet 180 and optionally a load balancer, through a plurality of Internet-accessible URLs or ports 142 (e.g., https://crm.mycompany.com 150, https://common.mycompany.com 154, and https://other.mycompany.com 156); and to internal services, located within the data center, through a plurality of internally-accessible URL's (e.g., crminternal.myco.com 160, commoninternal.myco.com 164, and otherinternal.myco.com 166). As described above, depending on the particular needs/requirements of the customer and/or the application itself, those URLs used within the data center need not be exposed or accessible outside of the data center to those Intranet or Internet-based customers.

Depending on the configuration ultimately deployed, external workstations can access applications at the data center by communicating requests 202 via the Internet, and the Internet-accessible URLs/ports, which then communicates those requests via the web servers configured with virtual URL's and proxies 204, to the application hosts 206, and if necessary the data tier 208.

It will be evident that the arrangement illustrated in FIG. 1 is provided for purposes of illustration, and that, in accordance with other embodiments, different types and arrangements of domains and servers may be provided within the application tier, and that the invention is not limited to the particular arrangement shown.

Figure 2:
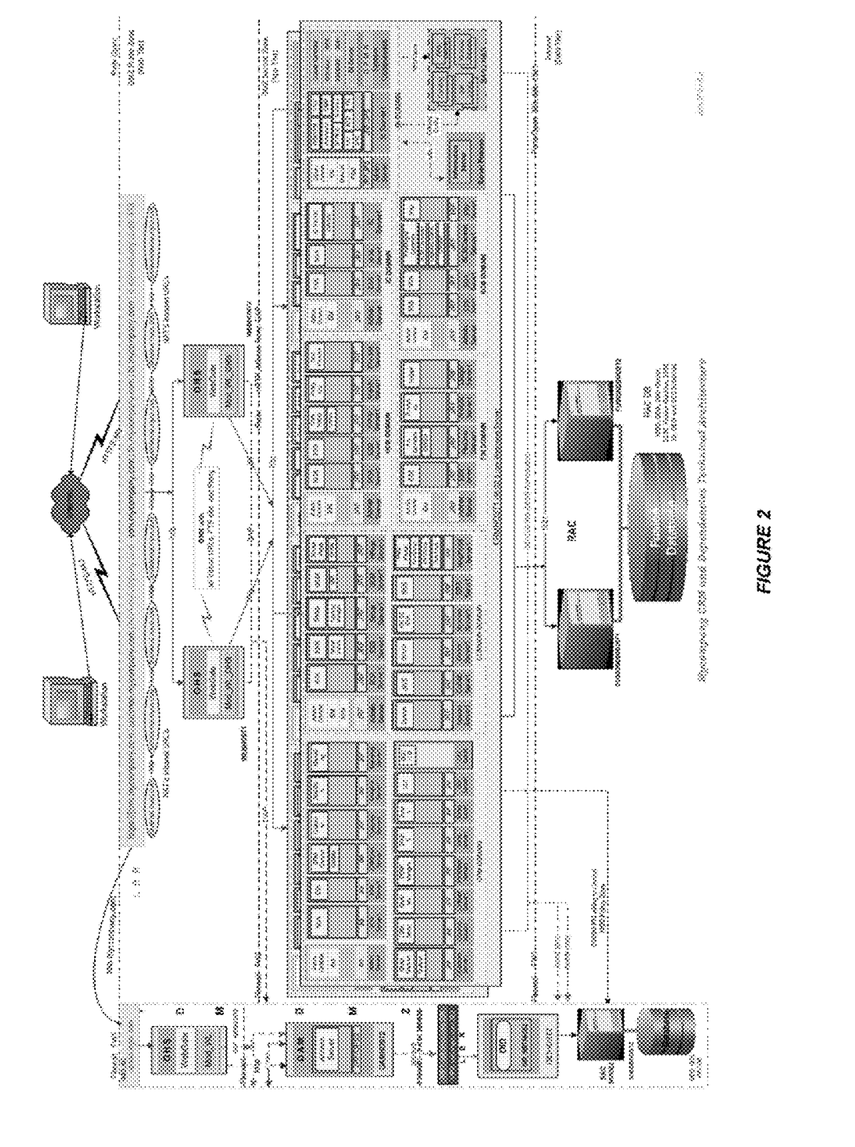
FIG. 2 illustrates another embodiment of a system which includes a multi-tiered enterprise deployment topology.

FIG. 2 illustrates another embodiment of a system which includes a multi-tiered enterprise deployment topology using Fusion Applications. In the example shown in FIG. 2, a primary node (CRMHOST1) is actively running a Fusion Applications instance. A secondary node (CRMHOST2) is the redundant (HA) node for that Fusion Applications instance. The primary node consists of an administration server and applications that have been deployed to managed servers. Managed servers can be grouped together in clusters to provide scalability and high availability for applications. Together, the primary and secondary nodes form a domain.

As further shown in FIG. 2, nodes in the web tier are located in the demilitarized zone (DMZ) public zone. In the example illustrated, two nodes WEBHOST1 and WEBHOST2 run Oracle HTTP Server configured with WebGate, which allows requests to be proxied from Oracle HTTP Server to WebLogic Server, and which uses Oracle Access Protocol (OAP) to communicate with Oracle Access Manager running on OAMHOST1 and OAMHOST2, in the Identity Management DMZ. WebGate and Oracle Access Manager are used to perform operations such as user authentication. The Oracle Web Tier also includes a load balancer router to handle external requests. External requests are sent to the virtual host names configured on the load balancer. The load balancer then forwards the requests to Oracle HTTP Server. On the firewall protecting the Oracle Web Tier, only the HTTP ports are open: 443 for HTTPS, and 80 for HTTP.

When an external load balancer is used, it should preferably allow for: load-balancing traffic to a pool of real servers through a virtual host name, so that clients access services using the virtual host name (instead of using actual host names), and the load balancer can then load-balance requests to the servers in the pool; port translation configuration so that incoming requests on the virtual host name and port are directed to a different port on the back-end servers; monitoring ports on the servers in the pool to determine availability of a service; configuring virtual server names and ports, including for each virtual server, the load balancer should allow configuration of traffic management on more than one port; detecting node failures and immediately stop routing traffic to the failed node; maintaining sticky connections to components, examples of which include cookie-based persistence or IP-based persistence; terminating SSL requests at the load balancer and forward traffic to the back-end real servers using the equivalent non-SSL protocol (e.g., HTTPS to HTTP); and other features as appropriate.

As further shown in FIG. 2, nodes in the application tier are located in the DMZ secure zone. CRMHOST1 and CRMHOST2 run the managed servers in the Oracle Fusion Customer Relationship Management, Oracle Business Intelligence, Oracle Incentive Compensation, Oracle Fusion Financials, Oracle Fusion Supply Chain Management, and Oracle Fusion Human Capital Management domains. CRMHOST1 and CRMHOST2 run the managed and C/C++ servers from different domains in an active-active or active-passive implementation. C/C++ components are managed by Oracle Process Manager and Notification Server (OPMN), and all the managed servers are managed by Administration Server within the domain. CRMHOST1 and CRMHOST2 also run the Oracle WebLogic Server Administration Console and Oracle Enterprise Manager Fusion Middleware Control, but in an active-passive configuration. On the firewall protecting the application tier, the HTTP ports, OAP port, and proxy port are open. The OAP port is for the WebGate module running in Oracle HTTP Server in the Oracle Web Tier to communicate with Oracle Access Manager. Applications requiring external HTTP access can use Oracle HTTP Server as the proxy.

As further shown in FIG. 2, in the data tier, located in the most secured network zone, an Oracle RAC database runs on the nodes FUSIONDBHOST1 and FUSIONDBHOST2. The database contains the schemas needed by the Oracle Fusion Applications components. The components running in the application tier access this database. On the firewall protecting the data tier, the database listener port (typically, 1521) is required to be open. The LDAP ports (typically, 389 and 636) are also required to be open for the traffic accessing the LDAP storage in the IDM enterprise deployment.

It will be evident that the deployment topology illustrated in FIG. 2 is provided for purposes of illustration, and that, in accordance with other embodiments, and depending on different customer sites, needs and requirements, different deployment topologies can be provided, and that the invention is not limited to the particular deployment topology shown.

Enterprise Deployment Topology for use with Thick Clients

In the context of software application products suitable for use over multiple geographic locations, or a hosted on-demand (or on-premise) application environment, applications such as Fusion Applications and other applications are typically locked down within a datacenter through the use of firewalls. In most instances, a user will access such applications using a published SSL URL, together with an appropriate username and password. However, in some instances, it may be desirable that the user use a thick client (e.g., a client utilizing remote method invocation (RMI), or a Java API) which in turn needs to be installed on that end-user's desktop. Since such thick clients need to communicate directly with the applications in the data center, this might otherwise require making holes in the firewall, which, as described above, can affect the data center security or performance. Particular, in the hosted on-demand environment, the thick clients may be in different companies' networks, requiring holes in both companies' firewalls.

To address this, in accordance with an embodiment, an administrative subnet can be created at the data center for use with thick clients, and such clients then hosted within the data center. A thick client user can then login using, e.g., published SSL URL over a VNC/remote desktop, and perform thick client activities, without a need for opening holes in the corporate/data center firewalls. Depending on customer needs/requirements, separate subnets can be created within the data center where the Fusion Applications thick clients are installed, and only the thick clients are configured to have access to the data center severs. An end-user can access the thick clients over, e.g. VPN using SSL enabled terminal server (or VNC). A user with valid credentials can then login to these servers using remote desk top and configure their components or run the reports, and/or can FTP data into this subnet and use tools provided within this subnet to load, analyze or update the data.

Figure 3:
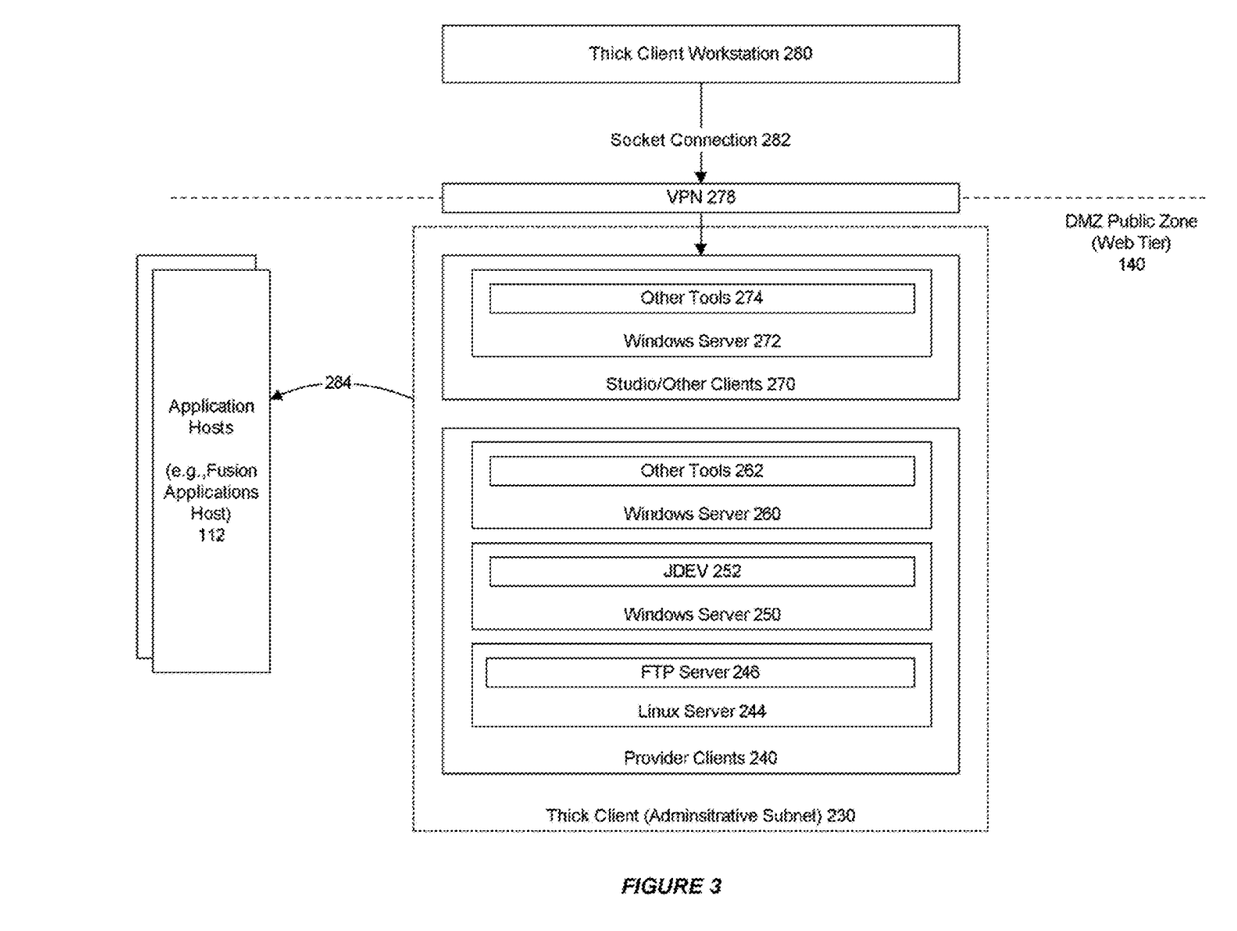
FIG. 3 illustrates a thick client, which can be used with a multi-tiered enterprise deployment topology, in accordance with an embodiment.

FIG. 3 illustrates a thick client, which can be used with a multi-tiered enterprise deployment topology, in accordance with an embodiment. As shown in FIG. 3, the thick client or administrative subnet, which is located within the DMZ-secured public zone or web tier, can include one or more provider clients 240, each of which in turn can include a server (e.g., a Linux server 240, or Windows server 250, 260) and a variety of administrative or other tools (e.g. an FTP server 246, JDev tool 252, or other tools 262). Other clients 270, servers 272, and tools 274 can be provided depending on the particular needs/requirements for a multi-tiered application environment. A thick-client workstation 280, located outside of the data center, can access the thick client or administrative subnet via a VPN 278, and socket connection 282. Requests from the thick-client workstation can be communicated via the thick client or administrative subnet and forwarded 284 to the application hosts, using appropriate protocols such as HTTP, RMI, ODBC or OAP.

Figure 4:
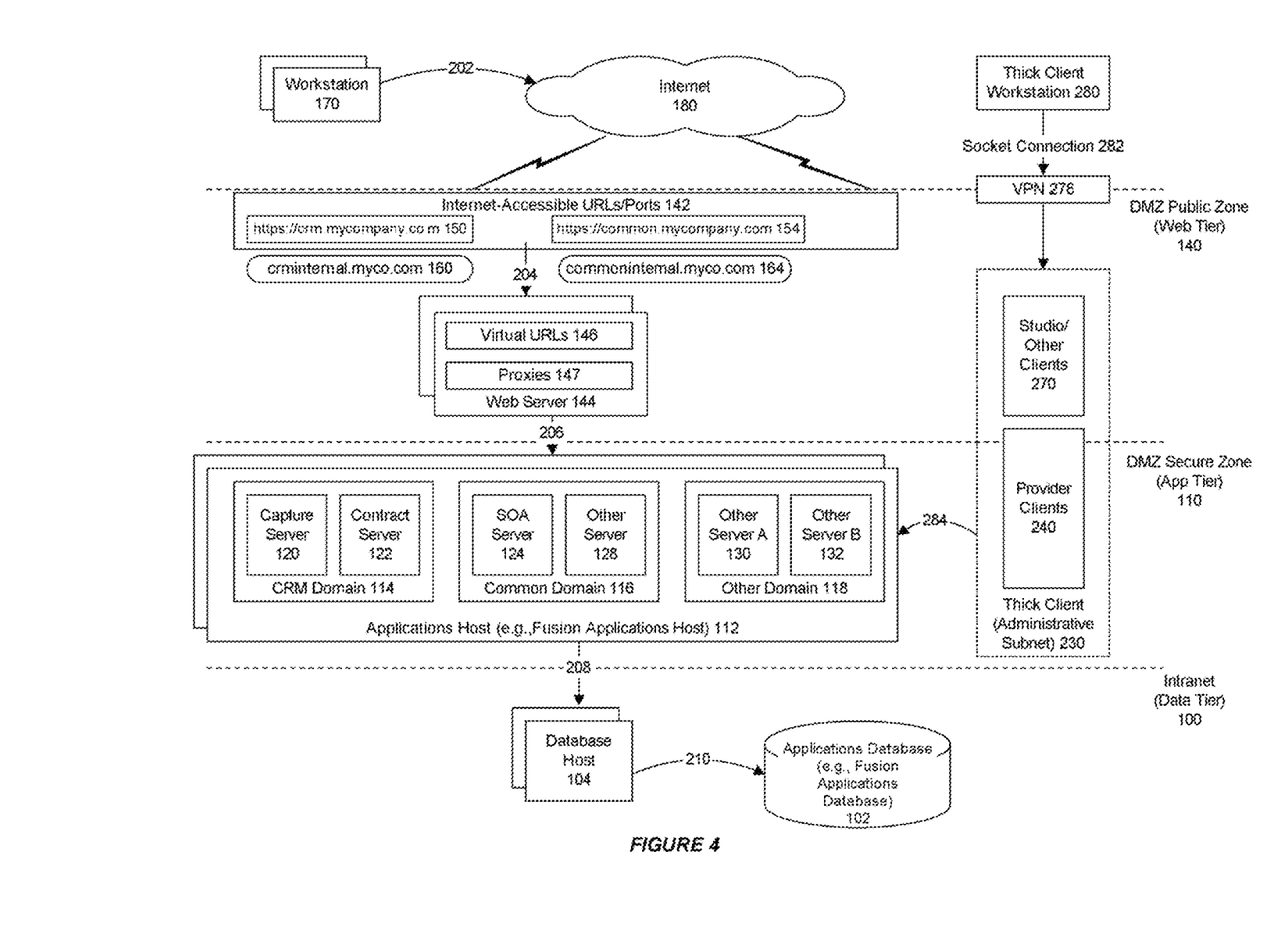
FIG. 4 illustrates a system which includes a multi-tiered enterprise deployment topology, together with a thick client, in accordance with an embodiment.

FIG. 4 illustrates a system which includes a multi-tiered enterprise deployment topology, together with a thick client, in accordance with an embodiment. As shown in FIG. 4, the environment can includes a data tier, application (app) tier, and DMZ-secured public zone or web tier, as described previously. Requests from the thick-client workstation can be communicated via the thick client or administrative subnet and forwarded to the application hosts.

Figure 5:
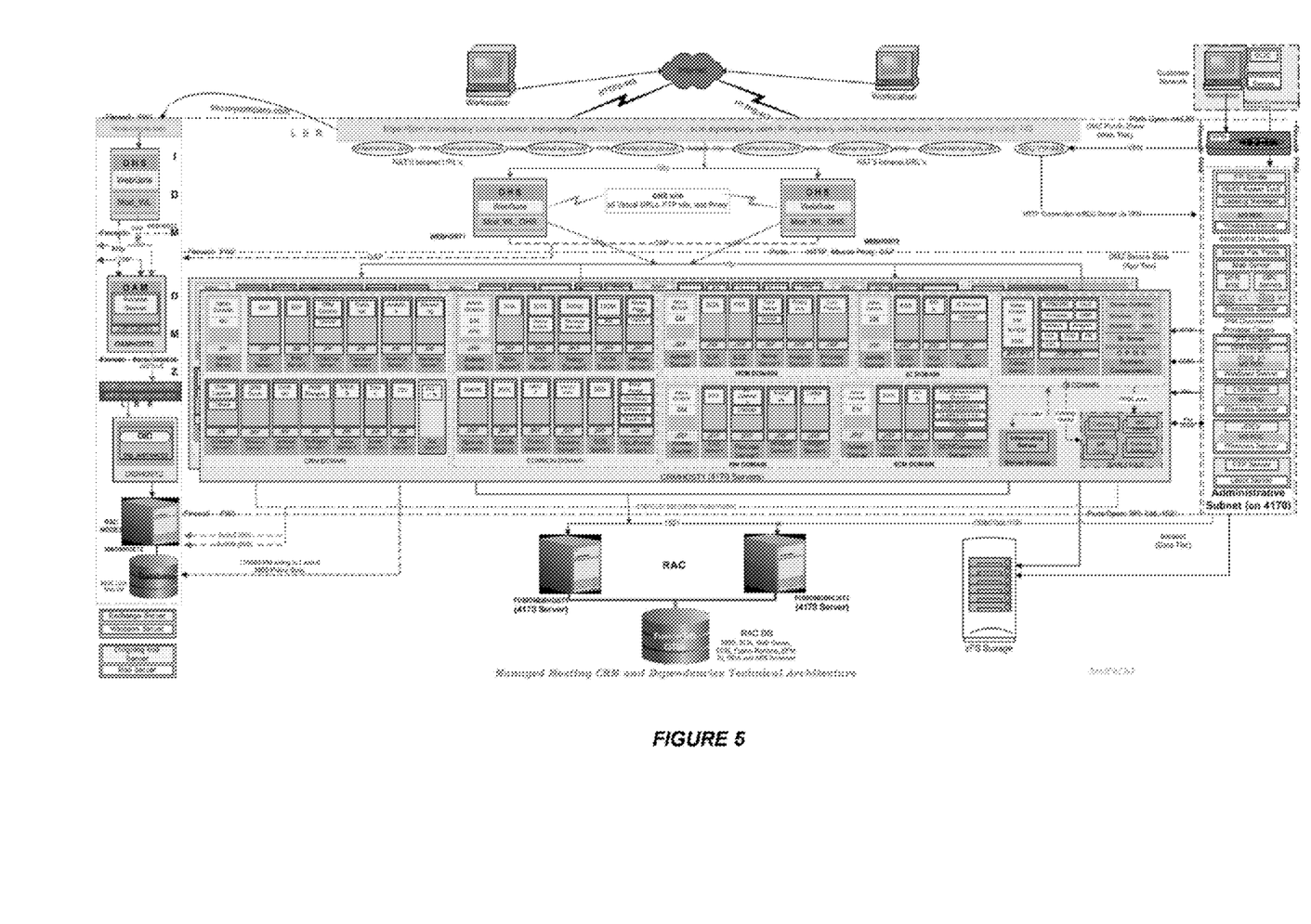
FIG. 5 illustrates another embodiment of a system which includes a multi-tiered enterprise deployment topology, together with a thick client.

FIG. 5 illustrates another embodiment of a system which includes a multi-tiered enterprise deployment topology, together with a thick client. As shown in FIG. 5, a Fusion Applications environment, similar to that described above with regard to FIG. 2, can be similarly used with a thick-client workstation, wherein requests can be communicated via the thick client or administrative subnet and forwarded to the application hosts, in this example using a variety of protocols such as HTTP, RMI, ODBC or OAP, depending on the particular requirements of each application, and the particular needs of the enterprise.

In accordance with an embodiment, there may be a plurality of administrative clients/thick clients which require direct access from the end users to, e.g. the application servers or to the file system, via HTTP, socket or other connections. Some of these thick clients may be connecting from either within the Intranet (for on-premise deployment), or via a VPN (for on-demand deployment). For example, a typical Fusion Applications environment may include one or more administrative client applications, e.g., FR Studio; OBIEE Administrative Client; BI Catalog Manager; or IPM document provider clients such as OFR, OFR Verifier, OFR Designer; ODC; Mail Server for ODC; FTP Server; JDev; and/or ODI Studio. Since each of these thick clients may need direct access (e.g., a socket connection) to the internal data centre environment, in accordance with an embodiment the administrative subnet can include a plurality of windows servers that are used to install one or more administrative thick clients therein, so that each particular administrative client application can use protocols and/or sockets appropriate to that particular administrative client application (e.g. HTTP, RMI, ODBC or OAP) to access the data center.

It will be evident that the use of thick clients with the deployment topology illustrated in FIG. 5 is also provided for purposes of illustration, and that, in accordance with other embodiments, different deployment topologies and uses of thick clients can be provided, and that the invention is not limited to the particular deployment topology shown.

Figure 6:
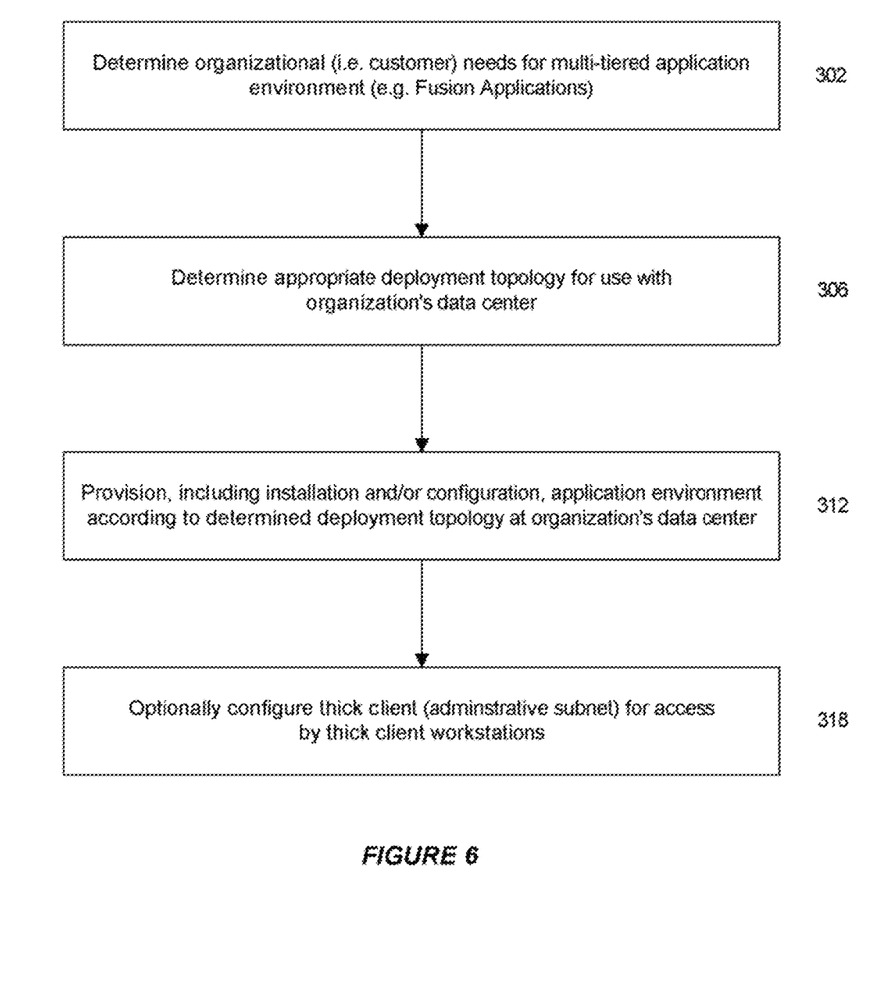
FIG. 6 illustrates a method of installing and/or configuring a system which includes a multi-tiered enterprise deployment topology, in accordance with an embodiment.

FIG. 6 illustrates a method of installing and/or configuring a system which includes a multi-tiered enterprise deployment topology, in accordance with an embodiment. As shown in FIG. 6, at step 302, an organization/customer's needs and/or requirements for a multi-tiered application environment (e.g., a Fusion Applications environment) are determined. At step 306, an appropriate deployment topology is determined for with the customer's data center, which takes into account the current aspects of the data center (e.g., database resources), and the customer's needs/requirements. At step 312, the application environment is provisioned (including installing and/or configuring components, such as web servers, application, Fusion Applications, etc) according to the deployment topology. At step 318, thick clients (administrative subnets) are optionally configured for use by thick client workstations, so that each particular client can use protocols and/or sockets appropriate to that particular client to access the data center.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system comprising:
   a data center having a deployment topology which includes a Demilitarized Zone (DMZ) public zone, a DMZ secure zone, and an Intranet Data Tier;
   a plurality of application hosts and applications provided in the DMZ secure zone according to the deployment topology, wherein said application hosts include one or more microprocessor;
   a plurality of virtual hosts and external URLs provided in the DMZ public zone for providing access to aspects of functionality of said plurality of application hosts and applications to Intranet-based users and Internet-based users;
   wherein said plurality of virtual hosts communicate with the plurality of application hosts and applications, using HTTP without secure socket layer (SSI) via internal URLs which are not exposed external to the data center, whereby the data center can process requests from said Intranet-based users and Internet-based users; and
   an administrative subnet in the DMZ public zone;
   a plurality of thick client applications hosted within the administrative subnet; and
   a VPN socket connection which allows SSL access to the administrative subnet from a workstation external to said data center, said VPN socket connection being independent of said external URLs provided in the DMZ public zone, whereby an administrative user of the workstation can communicate with said plurality of thick client applications such that said thick clients can communicate requests from the thick-client workstation to said plurality of application hosts and applications.

2. The system of claim 1, wherein said plurality of thick client applications includes a plurality of administrative applications and a plurality of provider applications.

3. The system of claim 1, wherein said virtual hosts may only communicate with said plurality of application hosts and applications using HTTP, but wherein said plurality of thick clients communicate with said plurality of application hosts and applications using a variety of protocols including two or more of HTTP, ODBC, RMI, and OAP, depending on the particular requirements of each application, and the particular needs of the enterprise.

4. The system of claim 1, wherein said DMZ public zone comprises a firewall in which all ports are closed other than port 443 for HTTPS and port 80 for HTTP.

5. The system of claim 1, wherein said DMZ public zone comprises a firewall in which only HTTP ports are open.

6. The system of claim 1, wherein said administrative user can communicate with said plurality of thick clients such that said thick clients using a published SSL URL over a VNC/remote desktop to perform thick client activities.

7. The system of claim 1, wherein said administrative subnet comprises a plurality of Windows servers upon which said plurality of thick clients is installed.

8. The system of claim 1, wherein each of said plurality of thick clients in configured for use by an administrative user of the workstation external to the data center so that each of said plurality of thick clients can use appropriate protocols to access said data center.

9. The system of claim 1, wherein said plurality of thick clients includes a plurality of applications selected from the group consisting of: FR Studio, OBIEE Administrative Client, BI Catalog Manager, OFR, OFR Verifier, OFR Designer, ODC, Mail Server for ODC, FTP Server, JDev, and OD1.

10. A method, comprising:
providing a data center deployment topology including a Demilitarized Zone (DMZ) DMZ public zone, a DMZ secure zone, and an Intranet Data Tier;
providing a plurality of application hosts and applications in the DMZ secure zone according to the deployment topology;
providing a plurality of virtual hosts and external URLs in the DMZ public zone for providing access to aspects of functionality of said plurality of application hosts and applications to Intranet-based users and Internet-based users;
communicating between said plurality of virtual hosts and said plurality of application hosts and applications using HTTP without secure socket layer (SSL) via internal URLs which are not exposed external to the data center, whereby the data center can process requests from said Intranet-based users and Internet-based users; and
providing an administrative subnet in the DMZ public zone;
providing a plurality of thick client applications hosted within the administrative subnet; and
providing a VPN socket connection allows SSL access to the administrative subnet from a workstation external to said data center, said VPN socket connection being independent of said external URLs provided in the DMZ public zone, whereby an administrative user of the workstation can communicate with said plurality of thick client applications such that said thick clients can communicate requests from the thick-client workstation to said plurality of application hosts and applications.

11. The method of claim 10, wherein said plurality of thick client applications includes a plurality of administrative applications and a plurality of provider applications.

12. The method of claim 10, wherein said virtual hosts may only communicate with said plurality of application hosts and applications using HTTP, but wherein said plurality of thick clients communicate with said plurality of application hosts and applications using a variety of protocols including two or more of HTTP, ODBC, RMI, and OAP, depending on the particular requirements of each application, and the particular needs of the enterprise.

13. The method of claim 10, further comprising:
providing a firewall protecting said DMZ public zone in which all ports are closed other than port 443 for HTTPS and port 80 for HTTP.

14. The method of claim 10, further comprising:
providing a firewall protecting said DMZ public zone in which only HTTP ports are open.

15. The method of claim 10, further comprising:
allowing said administrative user to communicate with said plurality of thick clients such that said thick clients using a published SSL URL over a VNC/remote desktop to perform thick client activities.

16. The system of claim 10, wherein said administrative subnet comprises a plurality of Windows servers upon which said plurality of thick clients is installed.

17. The system of claim 1, wherein each of said plurality of thick clients in configured for use by an administrative user of the workstation external to the data center so that each of said plurality of thick clients can use appropriate protocols to access said data center.

18. A non-transitory computer readable medium, including instructions stored thereon which when read and executed by one or more computers cause the one or more computers to perform steps comprising:
providing a data center deployment topology including a Demilitarized Zone (DMZ) public zone, a DMZ secure zone, and an Intranet Data Tier;
providing a plurality of application hosts and applications in the DMZ secure zone according to the deployment topology;
providing a plurality of virtual hosts and external URLs in the DMZ public zone for providing access to aspects of functionality of said plurality of application hosts and applications to Intranet-based users and Internet-based users;
communicating between said plurality of virtual hosts and said plurality of application hosts and applications using HTTP without secure socket layer (SSL) via internal URLs which are not exposed external to the data center, whereby the data center can process requests from said Intranet-based users and Internet-based users; and
providing an administrative subnet in the DMZ public zone;
providing a plurality of thick client applications hosted within the administrative subnet; and
providing a VPN socket connection which allows SSL access to the administrative subnet from a workstation external to said data center, said VPN socket connection being independent of said external URLs provided in the DMZ public zone, whereby an administrative user of the workstation can communicate with said plurality of thick client applications such that said thick clients can communicate requests from the thick-client workstation to said plurality of application hosts and applications.

19. The method of claim 18, wherein said virtual hosts may only communicate with said plurality of application hosts and applications using HTTP, but wherein said plurality of thick clients communicate with said plurality of application hosts and applications using a variety of protocols including two or more of HTTP, ODBC, RMI, and OAP, depending on the particular requirements of each application, and the particular needs of the enterprise.

20. The method of claim 18, further comprising:
providing a firewall protecting said DMZ public zone in which only HTTP ports are open.

* * * * *

UNITED STATES PATENT AND TRADEMARK OFFICE
CERTIFICATE OF CORRECTION

PATENT NO. : 8,856,295 B2
APPLICATION NO. : 13/468792
DATED : October 7, 2014
INVENTOR(S) : Aliminati It is certified that error appears in the above-identified patent and that said Letters Patent is hereby corrected as shown below:

In column 10, line 17, in Claim 1, delete "applications," and insert -- applications --, therefor.

In column 10, line 59, in Claim 8, delete "in configured" and insert -- is configured --, therefor.

In column 11, line 3, in Claim 10, before "public", delete "DMZ".

In column 11, line 23, in Claim 10, after "connection" insert -- which --.

In column 12, line 5, In Claim 17, delete "in configured" and insert -- is configured --, therefor.

In column 12, line 43, in Claim 19, delete "The method of" and insert -- The non-transitory computer readable medium of --, therefor.

In column 12, line 51, in Claim 20, delete "The method of" and insert -- The non-transitory computer readable medium --, therefor.

Signed and Sealed this
Eighth Day of March, 2016

Michelle K. Lee
*Director of the United States Patent and Trademark Office*